United States Patent
Vargantwar et al.

(10) Patent No.: US 8,265,645 B2
(45) Date of Patent: *Sep. 11, 2012

(54) ASSIGNING AN ACCESS CHANNEL BASED ON A TIMER IN A WIRELESS COMMUNICATION SYSTEM

(75) Inventors: Sachin R. Vargantwar, Overland Park, KS (US); Manoj Shetty, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,607

(22) Filed: Feb. 29, 2012

(65) Prior Publication Data

US 2012/0165030 A1 Jun. 28, 2012

Related U.S. Application Data

(63) Continuation of application No. 12/816,948, filed on Jun. 16, 2010, now Pat. No. 8,155,655.

(51) Int. Cl.
*H04W 72/00* (2009.01)

(52) U.S. Cl. ....................................... 455/450; 370/335

(58) Field of Classification Search .................. 455/417, 455/422.1, 445, 450–452.2, 509–514; 370/328–338, 370/341, 431–448
See application file for complete search history.

(56) References Cited

U.S. PATENT DOCUMENTS

| | | | |
|---|---|---|---|
| 5,697,058 | A | 12/1997 | Paavonen |
| 6,085,089 | A | 7/2000 | Emmer et al. |
| 7,020,113 | B2 | 3/2006 | Lee et al. |
| 2006/0198324 | A1 | 9/2006 | Nerses et al. |
| 2008/0161032 | A1 | 7/2008 | Xue et al. |
| 2009/0034515 | A1 | 2/2009 | Cook et al. |

*Primary Examiner* — Kamran Afshar
*Assistant Examiner* — Kashif Siddiqui

(57) ABSTRACT

In a communication system, a wireless access node receives an access request from a wireless communication device. In response, the access node starts an access timer and transfers signaling to the communication system indicating the access request. If the access timer expires before a response to the signaling is received, then the access node provides the wireless communication device with wireless access to the communication system. The access node receives the response to the signaling. If the response is negative and is received before the access timer expires, then the access node denies the access request. If the response is negative and is received after the access timer expires, then the access node terminates the wireless access to the communication system for the wireless communication device.

20 Claims, 8 Drawing Sheets

ASSIGNING AN ACCESS CHANNEL BASED ON A TIMER IN A WIRELESS COMMUNICATION SYSTEM

RELATED CASES

This patent is a continuation of U.S. patent application Ser. No. 12/816,948 that was filed on Jun. 16, 2010 and is entitled "ASSIGNING AN ACCESS CHANNEL BASED ON A TIMER IN A WIRELESS COMMUNICATION SYSTEM." U.S. patent application Ser. No. 12/816,948 is hereby incorporated by reference into this patent.

TECHNICAL BACKGROUND

Wireless devices, such as cellular phones, communicate with other systems and devices via wireless communication networks. A wireless device connects with a wireless communication network by exchanging communications with an access node for that wireless network, such as a base station. The wireless device communicates with the access node using both control and access channels. Control channels are used to exchange control messages with connected wireless devices and each control channel may be shared among multiple wireless devices. Access channels are used for more bandwidth intensive communications, such as user voice and data communications, and each access channel can be used by one wireless device at a time.

Each access node on a wireless network has a limited number of access channels that the access node can allocate to wireless devices that are connected to the access node. As more access channels are allocated to various wireless devices the number of access channels available for allocation to other wireless devices is reduced. If communications are not being exchanged by a wireless device on an access channel, then that access channel does not need to be allocated to that wireless device and can be available for allocation to a wireless device that will exchange communications.

OVERVIEW

In a communication system, a wireless access node receives an access request from a wireless communication device. In response, the access node starts an access timer and transfers signaling to the communication system indicating the access request. If the access timer expires before a response to the signaling is received, then the access node provides the wireless communication device with wireless access to the communication system. The access node receives the response to the signaling. If the response is negative and is received before the access timer expires, then the access node denies the access request. If the response is negative and is received after the access timer expires, then the access node terminates the wireless access to the communication system for the wireless communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
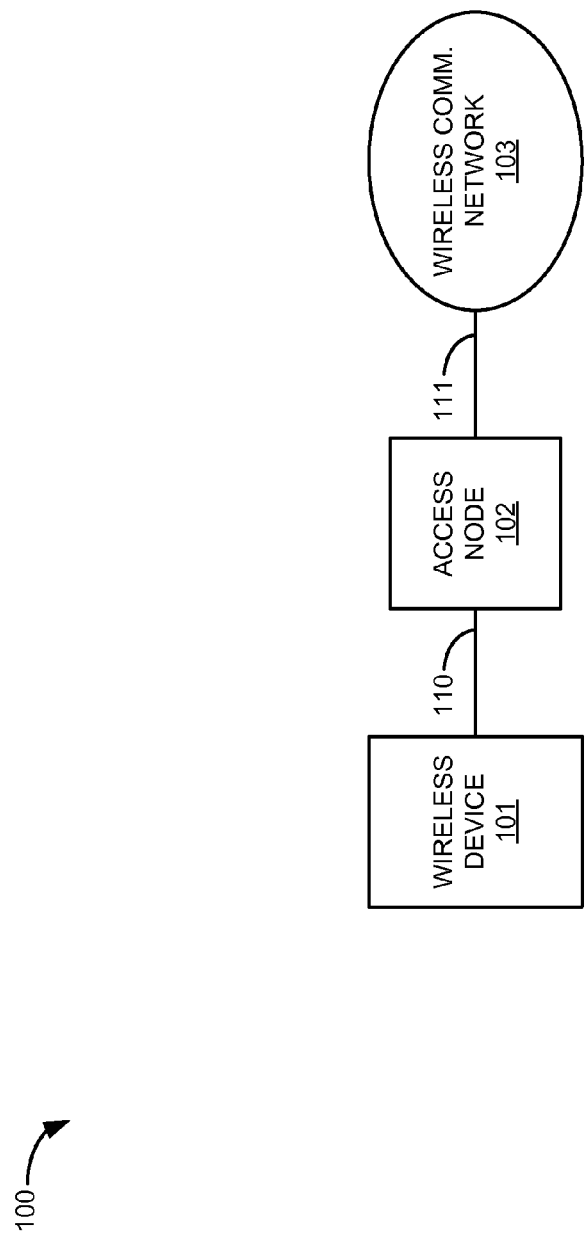
FIG. 1 illustrates a wireless communication system.

FIG. 1 illustrates wireless communication system 100. Wireless communication system 100 includes wireless communication device 101, wireless access node 102, and wireless communication network 103. Wireless communication device 101 and wireless access node 102 communicate over wireless link 110. Wireless access node 102 and wireless network 103 communicate over communication link 111.

In operation, wireless device 101 communicates with other devices and systems via access node 102 and wireless network 103. When exchanging communications other than control communications, such as voice and data communications, wireless device 101 requires an access channel provided by access node 102. Once wireless device 101 is assigned an access channel, then wireless device 101 and access node 102 can exchange communications over that access channel.

Access node 102 has a limited number of access channels to allocate to connected wireless devices, such as wireless device 101. Thus, when no communications are being exchanged with wireless device 101, access node 102 tries to not allocate an access channel to wireless device 101. Not allocating an access channel to wireless device 101 during periods where no communications are being exchanged on the access channel allows access node 102 to allocate that access channel to another device that needs the access channel for communications. Therefore, an access channel is assigned to wireless device 101 for less time during periods of communication inactivity increases the time that the access channel is available to be assigned to another device.

Figure 2:
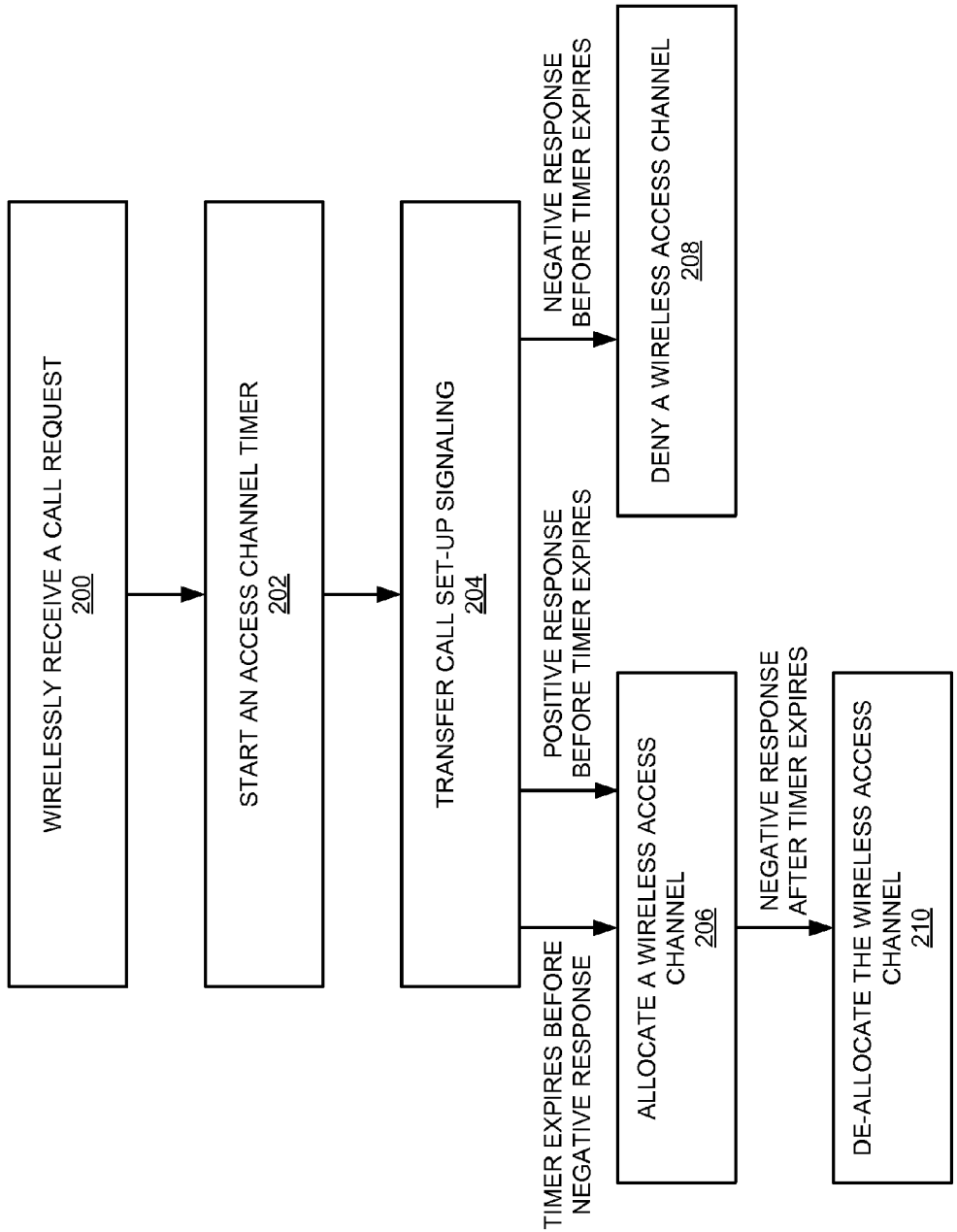
FIG. 2 illustrates the operation of a wireless communication system.

FIG. 2 illustrates the operation of wireless communication system 100. Access node 102 receives a call request from wireless device 101 (step 200). The call request may be for a voice call, video call, VoIP call, application data, or any other type of request for communications that would use an access channel from access node 102. The call may be received over a control channel of access node 102 that is used for control communications between access node 102 and wireless device 101, as well as other wireless devices connected to access node 102.

After receiving the call request from wireless device 101, access node 102 starts an access channel timer (step 202). The access channel timer indicates when an access channel should be allocated to wireless device 101 for the communications indicated by the call request. The access channel timer may take various forms. In one example, the access channel timer may be a countdown timer that begins with a set time value then, upon starting, counts down to zero. Alternatively, the timer may start at zero then count up to a set value. In another example, the timer may be a continuously running timer where access node 102 notes the time indicated by the timer after receiving the call request then monitors the timer for a set time increment. The access channel timer may be set to any length of time.

Access node 102 then transfers call set-up signaling to extend the call (step 204). The call set-up signaling may by any type of signaling or message that will allow the call to reach a destination indicated by the call. For example, if the call is a voice call then the destination may be a phone or wireless device. The call set-up signaling may be transferred to other systems and devices on wireless network 103 but may also be transferred from wireless network 103 to devices and systems on other communication networks.

In some embodiments access node 102 may determine a destination for the call request. The destination may be a device or system that is indicated by the call request, such as a phone number, address, or other type of identifier. The call set-up signaling may transfer the call request to a next system in a chain of systems leading to the destination or directly to the destination itself. Alternatively, the call set-up signaling may be a paging signal to the destination or may indicate to another system that the destination should receive a paging signal.

As stated above, the access channel timer may be set to any length of time. However, in some embodiments, the length of time may be an average of past times that wireless device 101, or other devices on access node 102 or wireless network 103, waited before receiving a response to the call set-up signaling. Otherwise, the access timer may be set to a time that strikes a balance between keeping an access channel available for other wireless devices while also providing wireless device 101 with an access channel for the call request in a timely manner.

If the access channel timer expires, or otherwise indicates that an amount of time has passed, before access node 102 receives a negative response to the call set-up signaling, then access node 102 allocates a wireless access channel to wireless device 101 for the call (step 206). The negative response may be a message, or some other type of signaling, that indicates that the call request cannot be completed. The negative response may be received the destination indicated by the call request or by a system or device in the network chain leading to the destination. For example, the destination for the call request may be a wireless device on another wireless network. If that wireless network is unable to reach the device then the wireless network may transfer a message back to access node 102 that the destination cannot be reached.

If the negative response is received to the call set-up signaling after the access channel timer expires, then access node 102 releases the wireless access channel from wireless device 101 (step 210). In this case, the access channel was already allocated to wireless device 101 upon the expiration of the access channel timer as described in the preceding example. Thus, when a negative response is received after the access channel has been allocated to wireless device 101, then the access channel should be released because no communications will be exchanged on the access channel with regards to the call request. After being released the access channel is now available to be assigned to other wireless devices communicating with access node 102.

Additionally, if the negative response is received to the call set-up signaling before the access channel expires, then access node 102 denies the wireless access channel to wireless device 101 (step 208). The access channel is denied because no communications will be exchanged on the access channel with regards to the call request and the access channel remains available for assignment to other wireless devices.

However, if a positive response is received to the call set-up signaling before the access channel timer expires, then access node 102 allocates the wireless access channel to the wireless communication device for the call (step 206). The positive response may be a message, or some other type of signaling, that indicates that the destination for the call request is available to be notified of the call request. The access channel is allocated to wireless device 101 because once the destination can be notified of the call request then it is more likely that the access channel will be needed for communications between wireless device 101 and the destination.

Therefore, the above discussion allows for access node 102 to wait before assigning an access channel to wireless device 101. This allows the access channel to remain unassigned for a longer period of time, which will allow the access channel to be assigned to another wireless device if needed.

In some embodiments, if access node 102 receives a negative response, then access node 102 transfers a message over the control channel to wireless device 101 indicating that the call request cannot be completed. Wireless device 101 may then notify the user of wireless device 101 accordingly.

In other embodiments, if access node 102 receives a positive response, then access node 102 establishes a call between wireless device 101 and the destination for the call over the access channel provided by access node 102.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 is a communication network that comprises telephony switches, wireless access nodes, Internet routers, network gateways, computer systems, communication links, or some other type of communication equipment—including combinations thereof.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 111 uses metal, glass, air, space, or some other material as the transport media. Communication link 111 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 111 could be a direct link or may include intermediate networks, systems, or devices.

Figure 3:
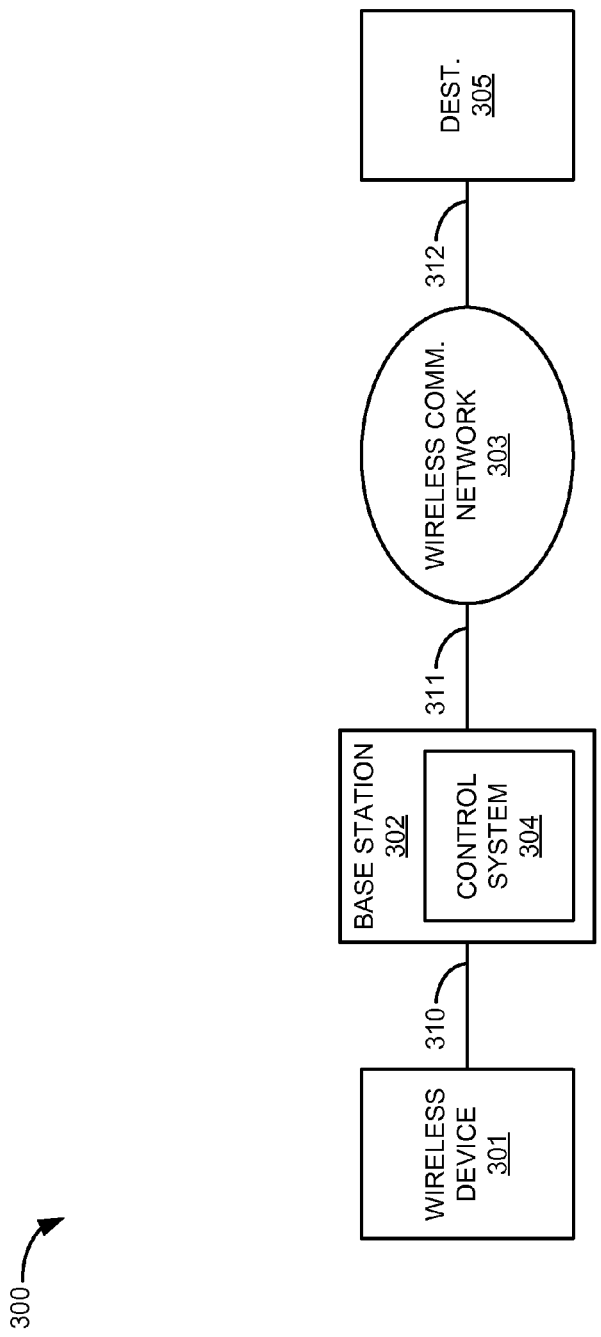
FIG. 3 illustrates a wireless communication system.

FIG. 3 illustrates wireless communication system 300. Wireless communication system 300 includes wireless communication device 301, base station 304, wireless communication network 303, control system 304, and destination 305. Wireless device 301 and base station 302 communicate over wireless link 310. Base station 302 and wireless network 303 communicate over link 311. Wireless network 303 and destination 305 communicate over link 312.

Communication control system 304 comprises a computer system and communication interface. Communication control system 304 may also include other components such a router, server, data storage system, and power supply. Communication control system 304 may reside in a single device or may be distributed across multiple devices. Communication control system 304 is shown internally to base station 302, but system 304 could be an independent system, such as an MSC, or integrated into another system of wireless network 303.

Destination 305 comprises a device or system that is capable of communicating with wireless device 301. Destination 305 may be a wireless communication device, wireline communication device, application system, or any other type of system or device. Destination 305 may be a system or device on wireless network 303 but may also be connected to wireless network 303 through other networks.

Figure 4:
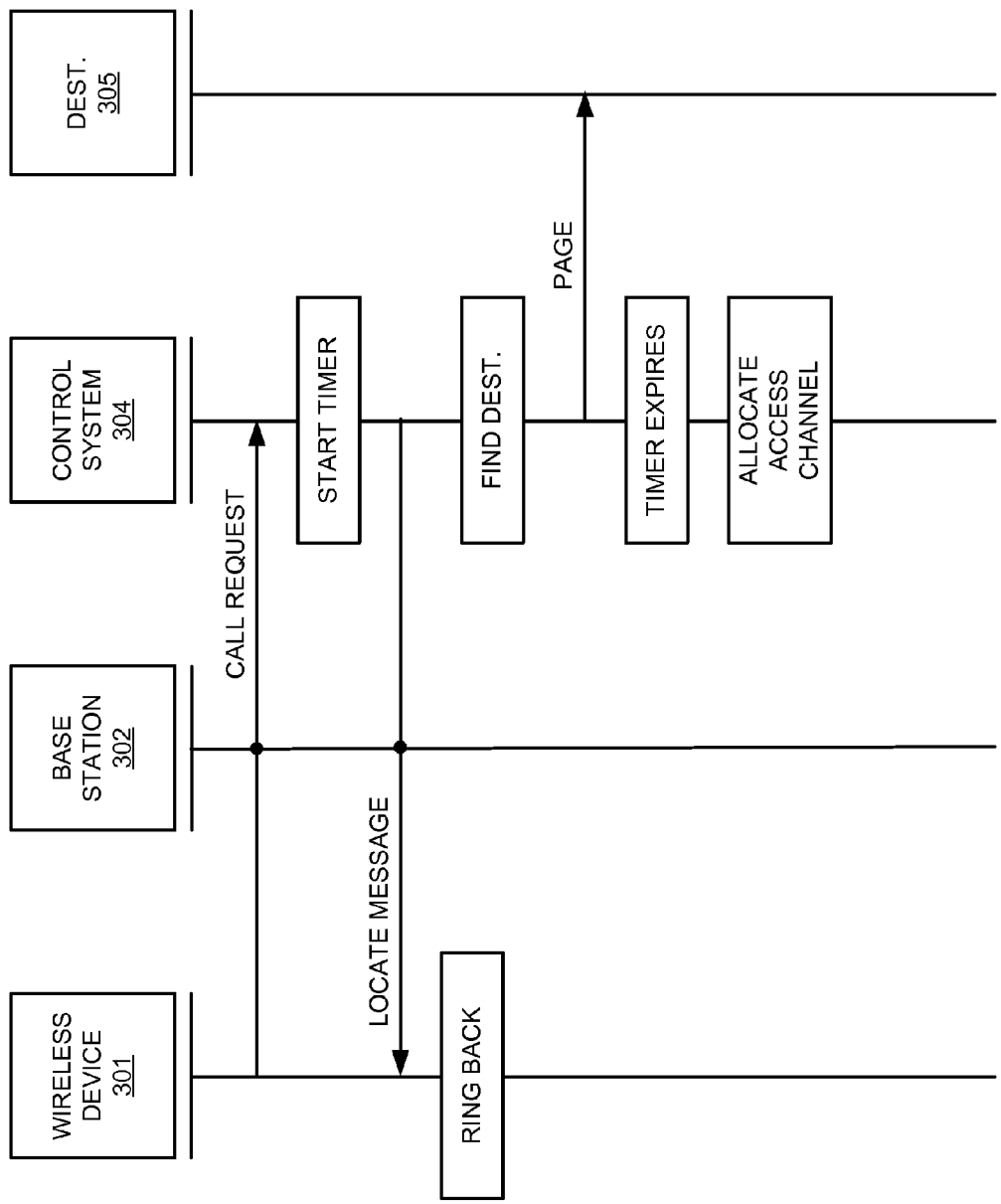
FIG. 4 is a sequence diagram illustrating the operation of a wireless communication system.

FIG. 4 is a sequence diagram illustrating the operation of wireless communication system 300. Wireless device 301 transfers a call request to base station 302 over a control channel used to exchange control communications between base station 302 and connected wireless devices. The call request indicates that wireless device 301 intends to establish a voice call with destination 305. Upon receiving the call request control system 304 starts an access channel timer. The access channel timer starts at a preset value and begins to count down to zero, which will indicate to control system 304 that an access channel should be allocated to wireless device 301.

Control system 304 transfers a locate message to wireless device 301 over the control channel. The locate message indicates to wireless device 301 that control system 304 is attempting to locate and contact destination 305. Upon receiving the locate message, wireless device 301 indicates to a user of wireless device 301 that destination 305 is being located. The indication may be in the form of a ring back tone or some other form of audible or visual message capable of conveying that destination 305 is being located.

Control system 304 then searches for destination 305 as indicated by the call request. The search may find the location of destination 305 on wireless network 303, or some other network, or may find the next step in a chain of systems or networks leading to destination 305, such as a public switched telephone network. Upon finding destination 305, control system 304 transfers a paging signal to destination 305. In this example, before receiving a response to the page from destination 305, the access channel timer reaches zero. In response to the expiration of the access channel timer, control system allocates an access channel for wireless device 301 and base station 302. The wireless access channel is used to exchange communications between wireless device 301 and destination 305 if and when destination 305 accepts the call from wireless device 301.

Figure 5:
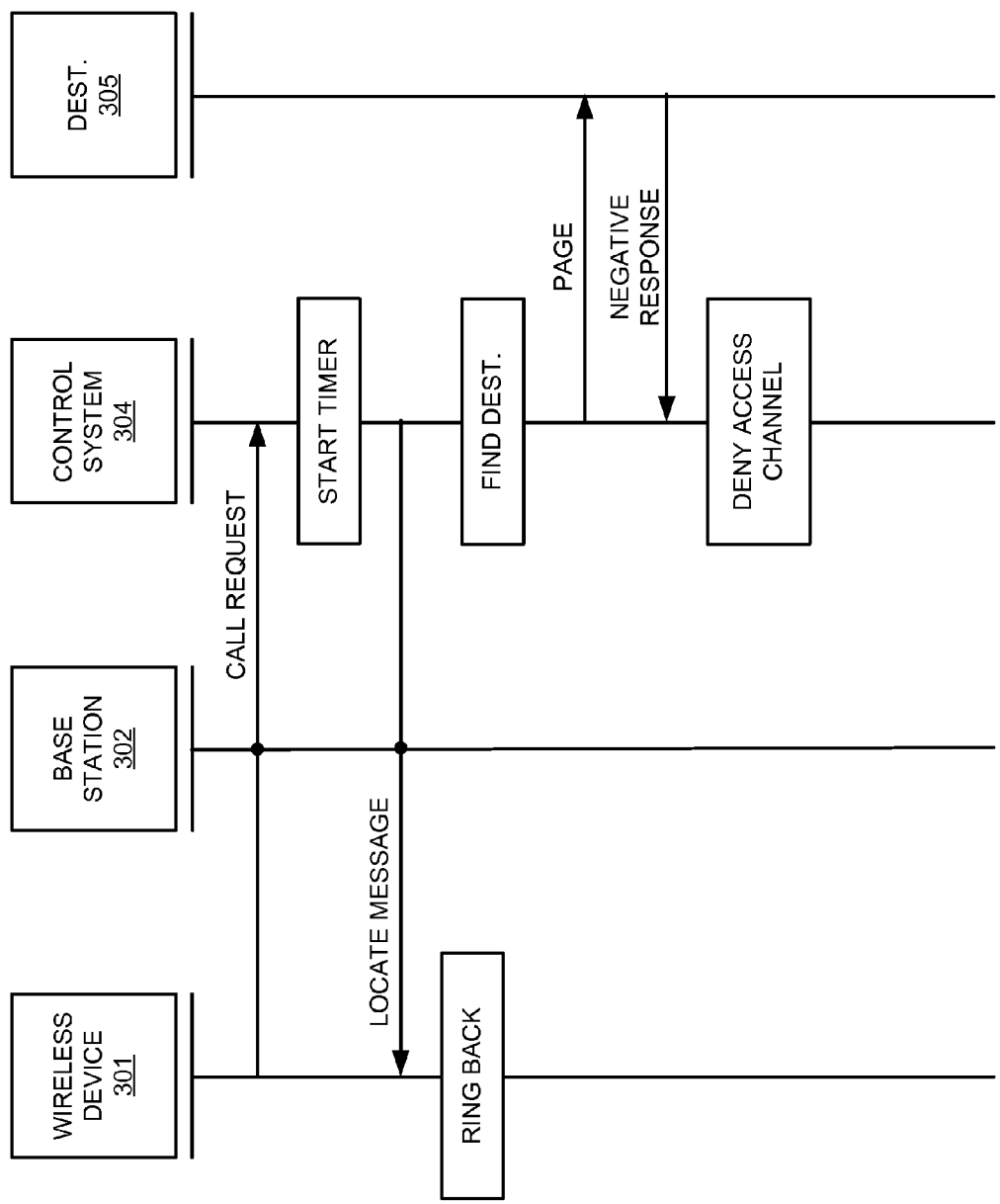
FIG. 5 is a sequence diagram illustrating the operation of a wireless communication system.

FIG. 5 is a sequence diagram illustrating the operation of wireless communication system 300. Wireless device 301 transfers a call request to base station 302 over a control channel used to exchange control communications between base station 302 and connected wireless devices. The call request indicates that wireless device 301 intends to establish a voice call with destination 305. Upon receiving the call request control system 304 starts an access channel timer. The access channel timer starts at a preset value and begins to count down to zero, which will indicate to control system 304 that an access channel should be allocated to wireless device 301.

Control system 304 transfers a locate message to wireless device 301 over the control channel. The locate message indicates to wireless device 301 that control system 304 is attempting to locate and contact destination 305. Upon receiving the locate message, wireless device 301 indicates to a user of wireless device 301 that destination 305 is being located. The indication may be in the form of a ring back tone or some other form of audible or visual message capable of conveying that destination 305 is being located.

Control system 304 then searches for destination 305 as indicated by the call request. The search may find the location of destination 305 on wireless network 303, or some other network, or may find the next step in a chain of systems or networks leading to destination 305, such as a public switched telephone network. Upon finding destination 305, control system 304 transfers a paging signal to destination 305. In this example, control system 304 receives a negative response indicating that destination 305 cannot be notified of the call or that destination 305 declined the call. Due to the negative response, control system 304 denies allocation of an access channel to wireless device 301 because wireless device 301 and destination 305 will not need the access channel to exchange communications. After receiving a negative response, the expiration of the access channel timer does not matter because control system 304 no longer needs to allocate an access channel to wireless device 301 for the communications related to the call request. Thus, the timer may be reset for future use or simply ignored.

Figure 6:
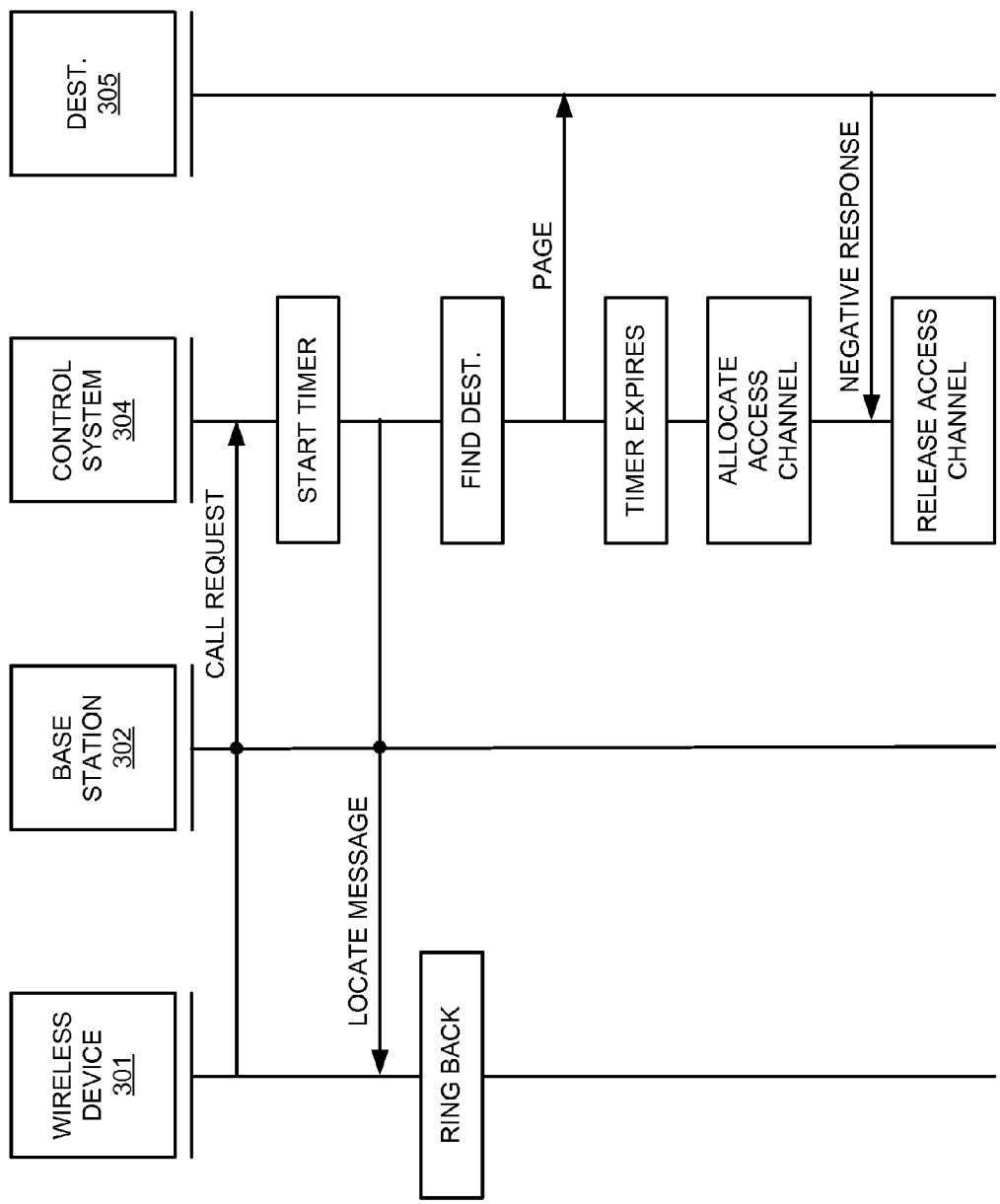
FIG. 6 is a sequence diagram illustrating the operation of a wireless communication system.

FIG. 6 is a sequence diagram illustrating the operation of wireless communication system 300. Wireless device 301 transfers a call request to base station 302 over a control channel used to exchange control communications between base station 302 and connected wireless devices. The call request indicates that wireless device 301 intends to establish a voice call with destination 305. Upon receiving the call request control system 304 starts an access channel timer. The access channel timer starts at a preset value and begins to count down to zero, which will indicate to control system 304 that an access channel should be allocated to wireless device 301.

Control system 304 transfers a locate message to wireless device 301 over the control channel. The locate message indicates to wireless device 301 that control system 304 is attempting to locate and contact destination 305. Upon receiving the locate message, wireless device 301 indicates to a user of wireless device 301 that destination 305 is being located. The indication may be in the form of a ring back tone or some other form of audible or visual message capable of conveying that destination 305 is being located.

Control system 304 then searches for destination 305 as indicated by the call request. The search may find the location of destination 305 on wireless network 303, or some other network, or may find the next step in a chain of systems or networks leading to destination 305, such as a public switched telephone network. Upon finding destination 305, control system 304 transfers a paging signal to destination 305. In this example, before receiving a response to the page from destination 305, the access channel timer reaches zero. In response to the expiration of the access channel timer, control system allocates an access channel for wireless device 301 and base station 302. The wireless access channel is allocated in anticipation of a positive response being received indicating that destination 305 is being notified about the call request.

However, in this example, control system 304 receives a negative response indicating that the destination could not be notified of the call request or has denied the call request. Due to the negative response, wireless device 301 will no longer need the access channel for communications related to the call request. Therefore, control system 304 releases the access channel that was previously allocated to wireless device 301 so that the access channel can be used for other wireless devices.

Figure 7:
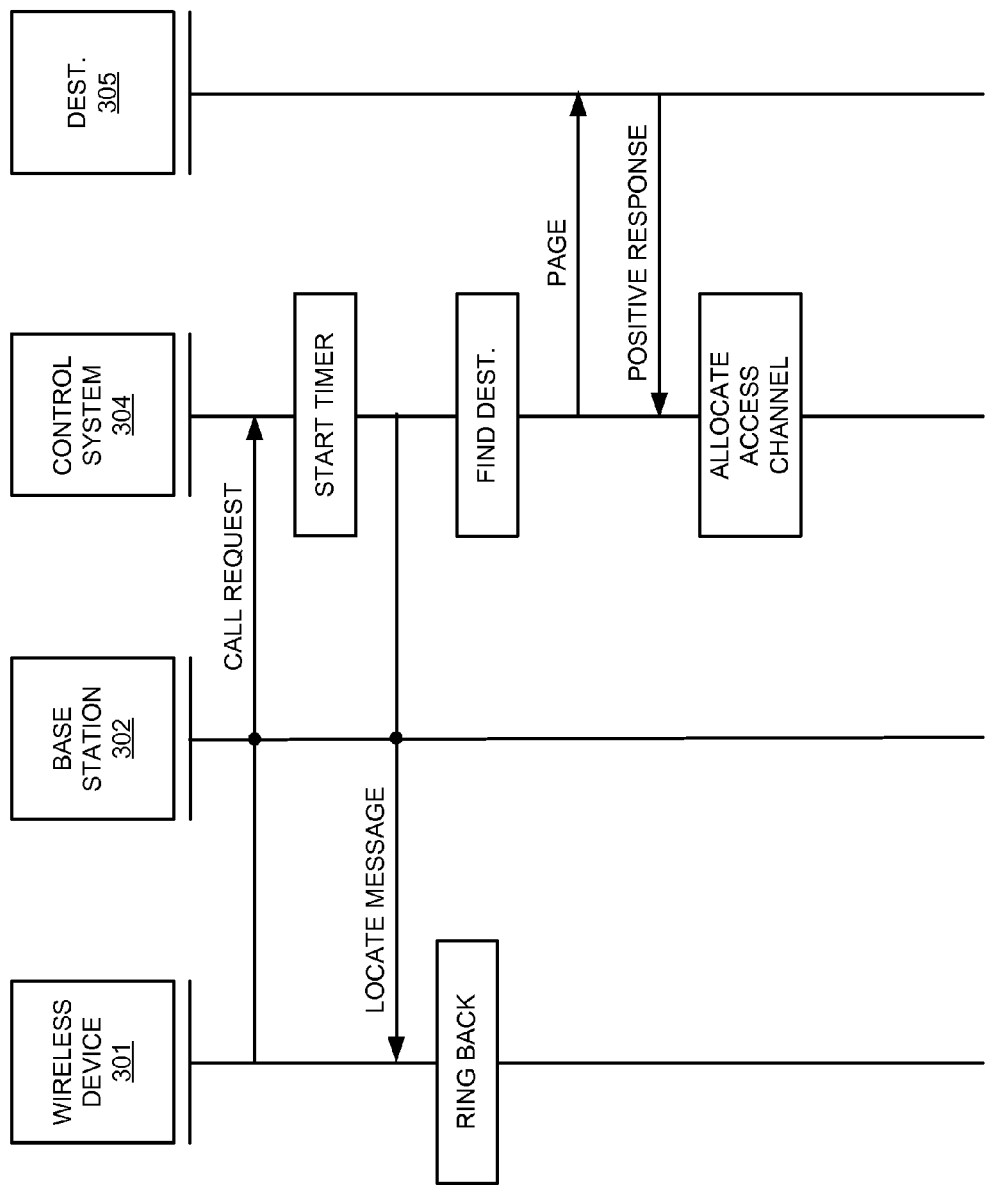
FIG. 7 is a sequence diagram illustrating the operation of a wireless communication system.

FIG. 7 is a sequence diagram illustrating the operation of wireless communication system 300. Wireless device 301 transfers a call request to base station 302 over a control channel used to exchange control communications between base station 302 and connected wireless devices. The call request indicates that wireless device 301 intends to establish a voice call with destination 305. Upon receiving the call request control system 304 starts an access channel timer. The access channel timer starts at a preset value and begins to count down to zero, which will indicate to control system 304 that an access channel should be allocated to wireless device 301.

Control system 304 transfers a locate message to wireless device 301 over the control channel. The locate message indicates to wireless device 301 that control system 304 is attempting to locate and contact destination 305. Upon receiving the locate message, wireless device 301 indicates to a user of wireless device 301 that destination 305 is being located. The indication may be in the form of a ring back tone or some other form of audible or visual message capable of conveying that destination 305 is being located.

Control system 304 then searches for destination 305 as indicated by the call request. The search may find the location of destination 305 on wireless network 303, or some other network, or may find the next step in a chain of systems or networks leading to destination 305, such as a public switched telephone network. Upon finding destination 305, control system 304 transfers a paging signal to destination 305. In this example, control system 304 receives a positive response indicating that destination 305 is being notified of the call request. Due to the positive response, control system 304 allocates an access channel to wireless device 301 because there is now increased likelihood that the call will be accepted by destination 305 and that communications will be exchanged between wireless device 301 and destination 305.

Figure 8:
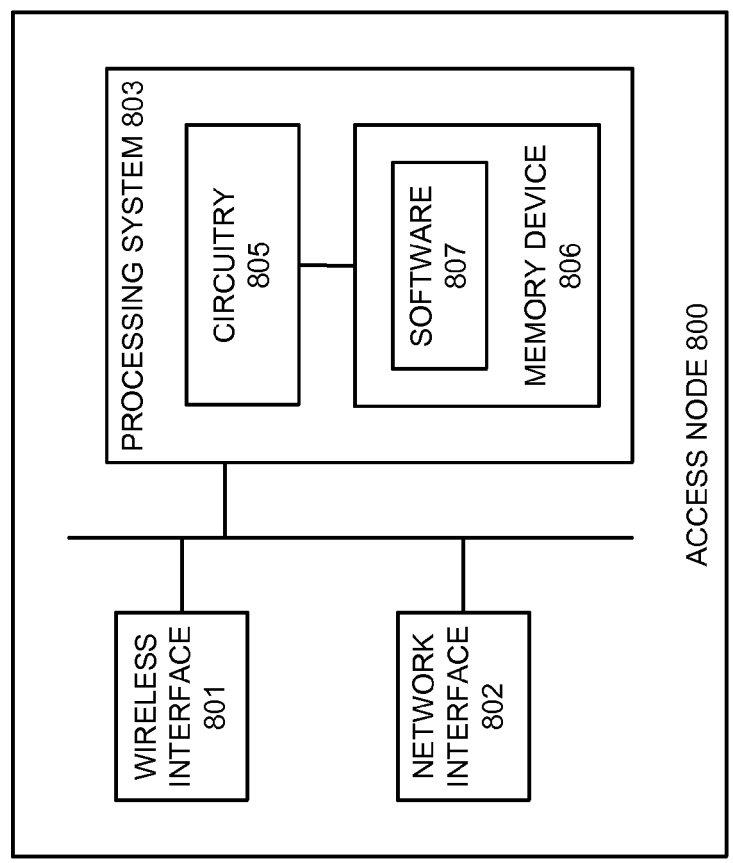
FIG. 8 illustrates a wireless access node.

FIG. 8 illustrates wireless access node 800. Access node 800 is an example of wireless access node 102, although access node 102 may use alternative configurations. Access node 800 comprises wireless communication interface 801, communication interface 802, and processing system 803. Processing system 803 is linked to communication interface 801 and user interface 802. Processing system 803 includes processing circuitry 805 and memory device 806 that stores operating software 807.

Wireless communication interface 801 comprises RF communication circuitry and an antenna. The RF communication circuitry typically includes an amplifier, filter, RF modulator, and signal processing circuitry. Wireless communication interface 801 may also include a memory device, software, processing circuitry, or some other communication device. Wireless communication interface 801 may use various protocols, such as CDMA, GSM, UMTS, HSPA, EV-DO, EV-DO rev. A, 3GPP LTE, WiMAX, Wi-Fi, or some other wireless communication format.

Network communication interface 802 comprises components that communicate over communication links, such as network cards, ports, RF transceivers, processing circuitry and software, or some other communication devices. Network communication interface 802 may be configured to communicate over metallic, wireless, or optical links. Network communication interface 802 may be configured to use TDM, IP, Ethernet, optical networking, wireless protocols, communication signaling, or some other communication format—including combinations thereof.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate access node 800 as described herein.

In particular, operating software 807 directs processing system 803 to wirelessly receive a call request from a wireless communication device via wireless communication interface 801. Processing system 803 further, in response to receiving the call request, starts an access channel timer. Communication interface 802 transfers call set-up signaling to extend the call. If the access channel timer expires before a negative response is received to the call set-up signaling, then processing system 803 allocates a wireless access channel to the wireless communication device for the call. If the negative response is received to the call set-up signaling before the access channel timer expires, then processing system 803 denies the wireless access channel to the wireless communication device for the call. If the negative response is received to the call set-up signaling after the access channel timer expires, then processing system 803 releases the wireless access channel from the wireless communication device. If a positive response is received to the call set-up signaling before the access channel timer expires, then processing system 803 allocates the wireless access channel to the wireless communication device for the call.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node in a communication system, the method comprising:

receiving an access request from a wireless communication device, and in response, starting an access timer and transferring signaling to the communication system indicating the access request;

if the access timer expires before a response to the signaling is received, then providing the wireless communication device with wireless access to the communication system;

receiving the response to the signaling;

if the response is negative and is received before the access timer expires, then denying the access request;

if the response is negative and is received after the access timer expires, then terminating the wireless access to the communication system for the wireless communication device.

2. The method of claim 1 further comprising, if the response is positive and is received before the access timer expires, then providing the wireless communication device with the wireless access to the communication system without waiting for the access timer to expire.

3. The method of claim 1 further comprising, if the response is positive and is received after the access timer expires, then continuing to provide the wireless communication device with the wireless access to the communication system.

4. The method of claim 1 wherein the access node comprises a Long Term Evolution (LTE) access node and wherein providing the wireless communication device with the wireless access comprises wirelessly exchanging LTE signals with the wireless communication device.

5. The method of claim 1 wherein the access node comprises a Wireless Fidelity (WiFi) access node and wherein providing the wireless communication device with the wireless access comprises wirelessly exchanging WiFi signals with the wireless communication device.

6. The method of claim 1 wherein the access node comprises a Code Division Multiple Access (CDMA) access node and wherein providing the wireless communication device with the wireless access comprises wirelessly exchanging CDMA signals with the wireless communication device.

7. The method of claim 1 wherein the access node comprises a Global System for Mobile Communications (GSM) access node and wherein providing the wireless communication device with the wireless access comprises wirelessly exchanging GSM signals with the wireless communication device.

8. The method of claim 1 wherein providing the wireless communication device with the wireless access comprises wirelessly receiving voice signals from the wireless communication device.

9. The method of claim 1 wherein providing the wireless communication device with the wireless access comprises wirelessly transferring video signals to the wireless communication device.

10. The method of claim 1 wherein providing the wireless communication device with the wireless access comprises wirelessly exchanging application data with the wireless communication device.

11. A wireless access node in a wireless communication system comprising:

a communication interface configured to receive an access request from a wireless communication device, transfer signaling indicating the access request to the communication system, and receive a response to the signaling from the communication system;

a processing system configured to start an access timer and generate the signaling responsive to the access request;

if the access timer expires before a response to the signaling is received, then the processing system is configured to direct the communication interface to provide the wireless communication device with wireless access to the communication system;

if the response is negative and is received before the access timer expires, then the processing system is configured to direct the communication interface to deny the access request; and if the response is negative and is received after the access timer expires, then the processing system is configured to direct the communication interface to terminate the wireless access to the communication system for the wireless communication device.

12. The wireless access node of claim 11 further comprising, if the response is positive and is received before the access timer expires, then the processing system is configured to direct the communication interface to provide the wireless communication device with the wireless access to the communication system without waiting for the access timer to expire.

13. The wireless access node of claim 11 further comprising, if the response is positive and is received after the access timer expires, then the processing system is configured to direct the communication interface to continue to provide the wireless communication device with the wireless access to the communication system.

14. The wireless access node of claim 11 wherein the access node comprises a Long Term Evolution (LTE) access node and wherein the wireless access comprises LTE signals.

15. The wireless access node of claim 11 wherein the access node comprises a Wireless Fidelity (WiFi) access node and wherein the wireless access comprises WiFi signals.

16. The wireless access node of claim 11 wherein the access node comprises a Code Division Multiple Access (CDMA) access node and wherein the wireless access comprises CDMA signals.

17. The wireless access node of claim 11 wherein the access node comprises a Global System for Mobile Communications (GSM) access node and wherein the wireless access comprises GSM signals.

18. The wireless access node of claim 11 wherein the wireless access comprises wireless voice signals.

19. The wireless access node of claim 11 wherein the wireless access comprises wireless video signals.

20. The wireless access node of claim 11 wherein the wireless access comprises wireless application data.

* * * * *